United States Patent [19]

Mouzas

[11] Patent Number: 5,428,512
[45] Date of Patent: Jun. 27, 1995

[54] SIDELIGHTING ARRANGEMENT AND METHOD

[76] Inventor: Alexander A. Mouzas, 5 Beach St., Saco, Me. 04072

[21] Appl. No.: 80,656

[22] Filed: Jun. 18, 1993

[51] Int. Cl.$^6$ .............................................. B60Q 1/00
[52] U.S. Cl. ...................................... 362/80; 362/36; 362/83.3; 362/251; 362/802
[58] Field of Search ...................... 362/61, 80, 82, 83, 362/83.3, 251, 276, 802, 36

[56] References Cited

U.S. PATENT DOCUMENTS

| | | | |
|---|---|---|---|
| 4,442,477 | 4/1984 | Hennessey | 362/52 |
| 4,663,696 | 5/1987 | Miyazawa et al. | 362/80 |
| 4,971,405 | 11/1990 | Hwang | 315/77 |
| 5,023,760 | 6/1991 | Izuno | 362/80 X |
| 5,025,352 | 6/1991 | Brown | 362/80 X |
| 5,209,559 | 5/1993 | Ruppel | 362/80 |

*Primary Examiner*—Stephen F. Husar
*Attorney, Agent, or Firm*—Thomas A. Kahrl

[57] ABSTRACT

An improved sidelighting arrangement, device and method of controlling sidelight illumination of a motor vehicle during cornering employing two sets of side lamps, one for each side of the vehicle. The sidelighting arrangement apparatus includes a steering wheel angle sensor mounted on the column of the steering wheel for detecting a change in steering angle, a turn indicator sensor for detecting actuation of the turn indicator, a microprocessor for outputting an electrical signal to selectively illuminate a set of side lamps mounted on the side of the vehicle for controlling illumination of the sidelights during cornering of the motor vehicle responsive to the steering wheel in actuation of the turn signal for improved visibility for the operator of the vehicle and for improved safety of operation thereof by providing notice to other drivers of the cornering condition of the vehicle.

15 Claims, 4 Drawing Sheets

SIDELIGHTING ARRANGEMENT AND METHOD

BACKGROUND OF THE INVENTION

1. Field of Invention

Improvements in lighting devices for motor vehicles today are typically directed toward increasing the illumination of the rear, fixed lights of a motor vehicle, with the objective of reducing rear end collisions by providing a larger illumination surface for alerting following motorists of a driver's intention to stop his vehicle, particularly where high speed travel is involved. Very little attention has been directed toward the lighting of vehicles and the direction toward which the vehicle, particularly tractor trailers are turning. Dangers are acknowledged to exist, particularly associated with turning of tractor trailers in that it is common to have signs posted at the rear of tractor trailers providing a warning that the vehicle makes "wide turns" and that motorists to the rear should be alerted of such turns. Clearly such signs are operative only during the daylight hours when it is indeed easier to detect that a tractor trailer is in the process of cornering, and such signs are of little or no value at night.

2. Description of Prior Art

Applicant is aware of other prior art cornering lights. One such device is disclosed in U.S. Pat. No. 4,663,696 issued to Miyazawa et al., which teaches a dual purpose lamp assembly for use as a combined fog and cornering lamp positioned in a flood front headlight fixture of a motor vehicle. The Miyazawa headlight includes a movable reflector which is a pivotable such that light rays can be projected forward where the rays function is fog lights, or alternatively the movable reflectors can provide a dual function and be pivoted such that light rays are reflected to the side and function as cornering headlights, as well as illuminating lights in front of the vehicle. This reference also discloses that cornering lights can be used in combination with a turn signal system to supplement such headlights. Miyazawa, however, differs from the present invention in that the lamp assembly is positioned at the front of the vehicle, in the conventional headlight fixture, is not positioned on the side of the body of the vehicle, is directed toward focusing light in front of the vehicle in the direction that the wheels are turning and does not illuminate the area to the side of the vehicle in the direction toward which the vehicle is turning such that it is visible to a following motorist. In another reference, U.S. Pat. No. 4,442,477 issued to Hennessey, teaches cornering lights that are switched on by operating a headlight turn lever, which are connected to a light-detecting sensor for controlling the brightness of illumination. Again, Hennessey is directed toward headlight cornering illumination, and does not disclose use of side lamps for illuminating the area to the side of vehicles. Another prior art device disclosed in U.S. Pat. No. 4,971,405 issued to Hwang, teaches a headlight for a vehicle which is interconnected to the steering mechanism of the vehicle so as to rotate in conjunction with the turning of the front wheels. Hwang also discloses corner lights adjacent to the headlights which are disposed to the right and left corners of the vehicles. The light detecting sensors detect the light of the headlights from opposing vehicles, in controlling brightness of the illumination of the light system to prevent the view of a driver from an opposing vehicle from being disturbed and therefore is distinguishable from applicant's invention.

Accordingly, it is desirable to provide for a new and improved, effective sidelighting arrangement and to a method for controlled projection of illumination of the side of a vehicle during cornering of such motor vehicle to provide for employment of the improved sidelighting arrangement which overcomes at least some of the disadvantages of the prior art.

SUMMARY OF THE INVENTION

The present invention is directed to a sidelighting device, a sidelighting arrangement including a microprocessor for automatically activating a sidelighting system adapted for motor vehicle use in combination with a steering mechanism, and to a method of automatically projecting illumination laterally from the side of a motor vehicle, employing the sidelighting arrangement of the invention. In particular, the present invention is directed to an improved sidelighting arrangement for illuminating an area adjacent a selected side of a vehicle body when turning, particularly when cornering, in combination with a steering wheel sensing apparatus, and to a plurality of lamps for selective mounting on the sides of the body motor vehicle adapted for positioning in a plurality of vehicle body locations, for projecting a sector of light on the side laterally toward which the vehicle is turning, during cornering.

Another feature of the invention is that by automatically illuminating the sidelights when a turn is in progress, the side-lighting arrangement provides an important safety feature by providing appropriate lighting for both the driver while making turns, and for following motorists who are given an indication of said drivers turning intentions during cornering.

The invention further comprises method of automatically illuminating the area adjacent a selected side of a motor vehicle, during cornering and otherwise at the option of the driver, employing the sidelighting arrangement of the invention including two sets of side lamps for selective mounting on the side of a motor vehicle for laterally projecting a sector of light toward the area on the side toward which the vehicle is turning, during cornering.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

DETAILED DESCRIPTION OF THE PREFERRED EMBODIMENT

Figure 1:
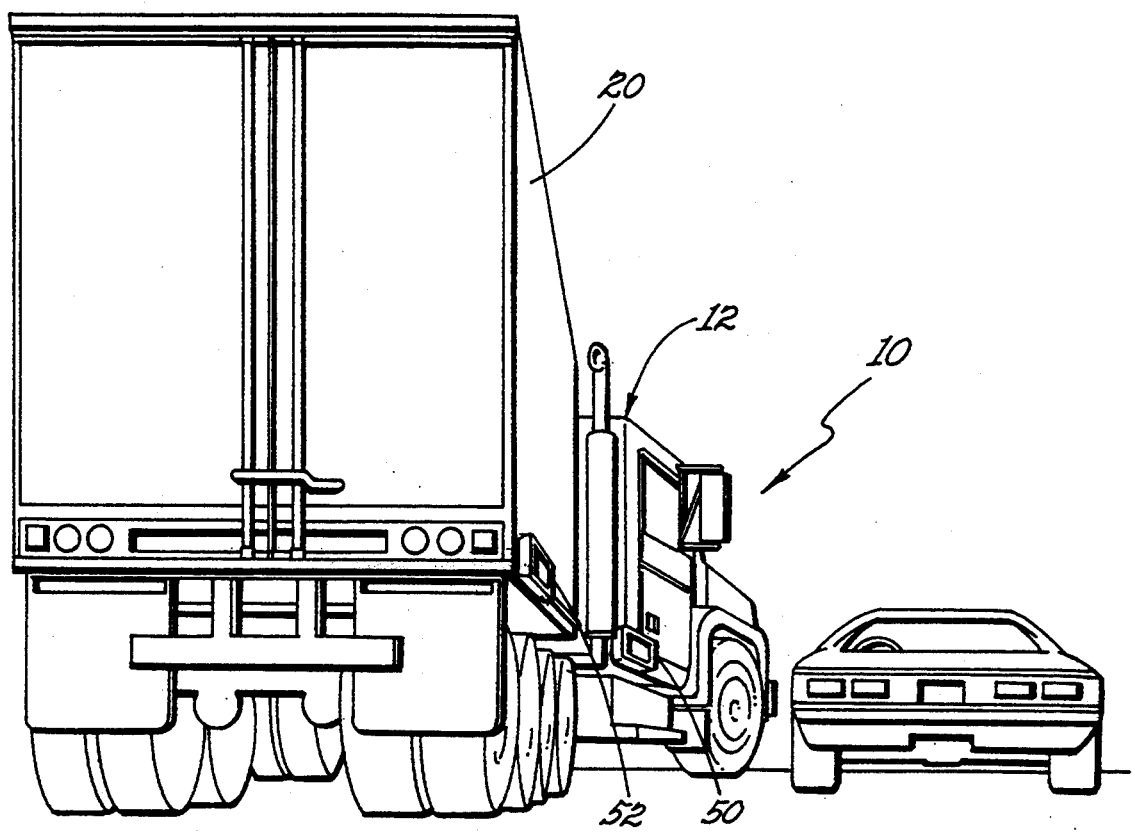
FIG. 1 is a perspective view of the sidelighting arrangement of the present invention taken from the rear of a tractor-trailer shown during cornering with an adjacent automobile, the tractor-trailer having a plurality of side lamps mounted on the cab and trailer.

The present invention relates to a sidelighting arrangement, for use with motor vehicles, and in particular to a sidelighting arrangement adapted to project sectors of light outwardly from the side of a motor vehicle during cornering, and to providing notice to other drivers of the cornering condition of the vehicle.

Referring now to the drawings, there is shown a sidelighting arrangement 10 adapted for use on a motor vehicle 12 comprising a sensor device 14 connected to an electronic control device consisting of a micro process adapted to automatically turn on a sidelamp driver circuit 18 in the direction in which said motor vehicle is turned.

In the preferred embodiment the sidelighting apparatus 10 is adapted for mounting on a trailer 20 of a tractor trailer shown in FIG. 1 wherein the sensor apparatus 14 is mounted on the steering wheel 22 consisting of a fixed column 24, an annular hub 26, on which is mounted a ring 28. The sensor device 14 comprises a fixed magnet 30 mounted in a selected position on the fixed column 24, and a plurality of movable magnetic sensors 32, typically "Hall Effect" sensors positioned in mutually spaced apart relationship, and radiantly spaced outwardly on a concentric annular surface 34 on the inside of the hub 26, such that as the steering wheel 22 is turned in either a counter clockwise or in a clockwise direction, selected Hall Effect sensors 32 are moved into alignment with the fixed magnet 26. In the preferred embodiment the magnetic sensors 32 are connected by an electric circuit 36 to the micro processor 16 which in turn is connected to a power source 38 for receiving power. The electric circuit 36 includes a first side-lamp driver circuit 42 for lighting the right hand side of the vehicle comprising a plurality of side lights 46 and 48 and a second side-lamp driver circuit 42 for lighting the left hand side of the vehicle 12 connected to a plurality of left hand side lights 50 and 52.

In the preferred embodiment, the sidelighting arrangement includes 10 two sets of side lights 46 and 48 and 50 and 52, each set typically consisting of a light emitting lamp device, said sets positioned on both sides of the vehicle 12 configured such that one set of sidelights is automatically illuminated corresponding to the direction in which the vehicle 12 is turning, responsive to output from a microprocessor device 16. The microprocessor 16 typically consists of an electronic control device, adapted for activating said sidelights and automatically turning said sidelights off when turning is complete.

Said sidelights consist of lamp devices, are of conventional construction, typically Hela FOGLITES® automotive lighting fixtures, having integral mounting devices and are configured with a wide angle beam. In the preferred embodiment, said sidelights are connected to power source 38 and also to a sensing apparatus 32 for sensing the amount and direction in which the steering mechanism is being turned, and signaling said microprocessor device, also connected to said power source. In this arrangement, the sidelighting arrangement incorporates sensors connected to said microprocessor to determine the direction in which steering wheel 22 of the motor vehicle 12 is being turned, wherein the sensors send a signal to the electronic control device 16 which automatically activates one or more of the side sets of lights 46 an 48 and 50 and 52positioned at a selected location on a selected side of the motor vehicle, for illuminating the side section adjacent the motor vehicle on the side of the turn. In so doing, the sidelighting arrangement provides an important safety feature by providing appropriate lateral lighting for both the driver, while making the turn, and for other motorists by providing an indication of the said driver's intentions for cornering.

In the preferred embodiment, the sidelighting arrangement further includes a first side circuit 42 for energizing said a first set of sidelights positioned on the first side of the vehicle 12, and a second side circuit 44 for energizing the side light emitting apparatus on the second side of the vehicle, each circuit connected to power source 38. Also mounting devices are provided for mounting one or more side-light emitting devices in selected locations on a first side of the body of the vehicle and for mounting on the second side of the body of said vehicle, typically with conventional lights such as Hela FOGLITES® automotive lighting fixtures, having a configuration including a housing device including an electric light bulb for projecting a wide angle of light, said housing having a mounting attachment for selective mounting on the side of a motor vehicle, typically on the side of the trailer section of a semi-truck by fastening to the frame. The lighting arrangement further includes a switch means for switching on the sets of sidelights, either manually or responsive to signals from the microprocessor.

Figure 2:
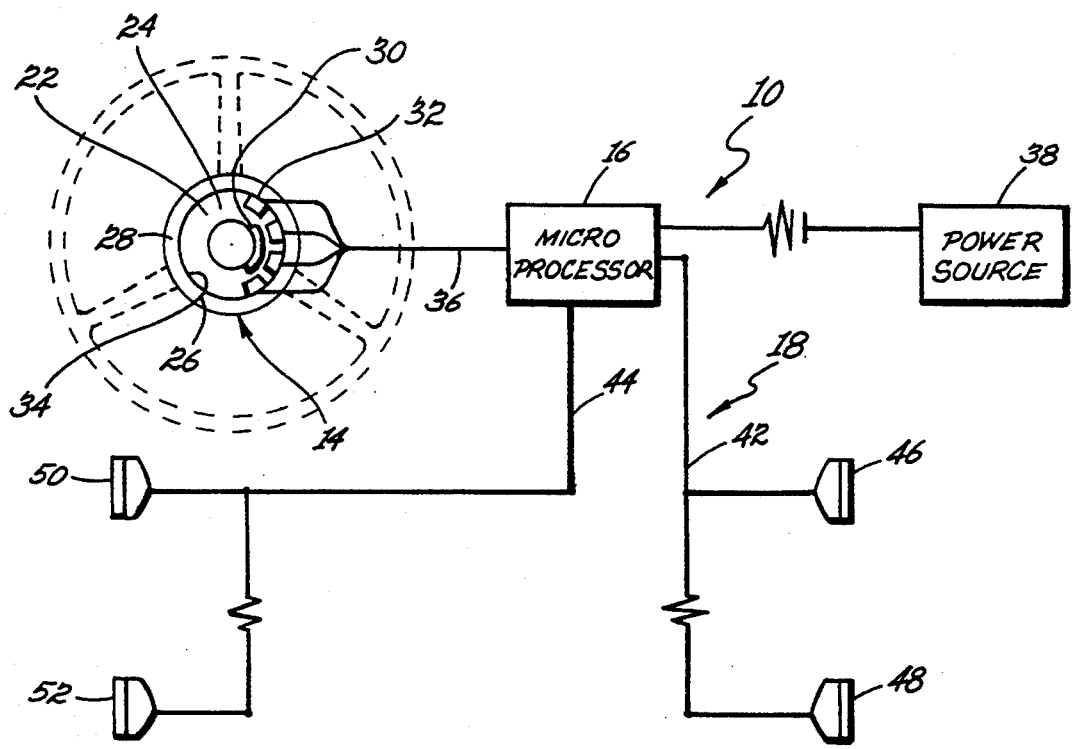
FIG. 2 is a block schematic diagram of the sidelighting arrangement of FIG. 1 showing magnet sensors, a steering wheel, a microprocessor, a power source, a circuit and lights connected thereto.
Figure 5A:
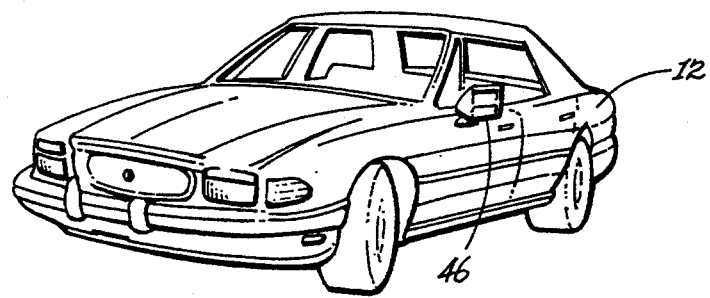
FIG. 5 A is a perspective view of a vehicle showing an alternate embodiment of the sidelight mounted on a rear view mirror.
FIG. 5B is a top view of the sidelight as shown in FIG. 5A.
Figure 5B:
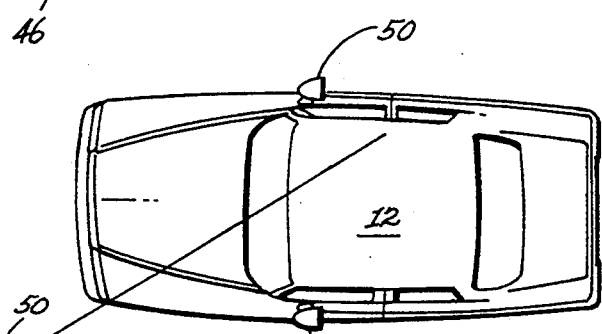
Figure 6:
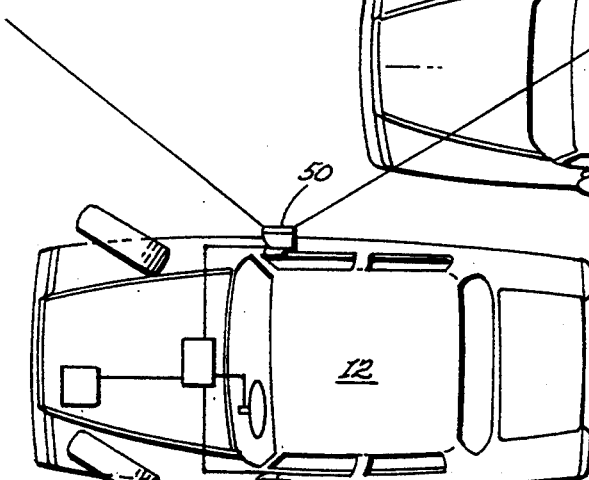
FIG. 6 is a top plan view of a vehicle having a further embodiment of the invention mounted on the top of the cab.
Figure 7:
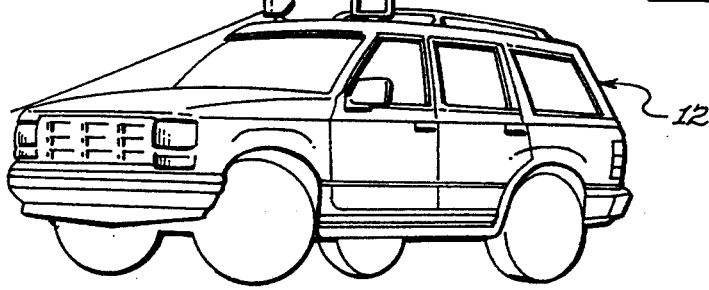
FIG. 7 is a perspective view of the invention shown in FIG. 6.
Figure 8:
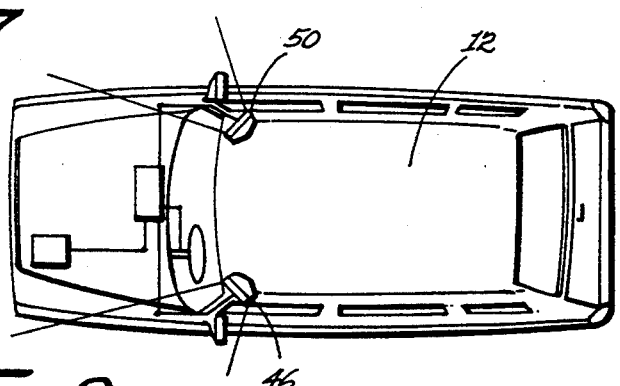
FIG. 8 is a further manual embodiment of the present invention operated by a turn signal.
Figure 9:
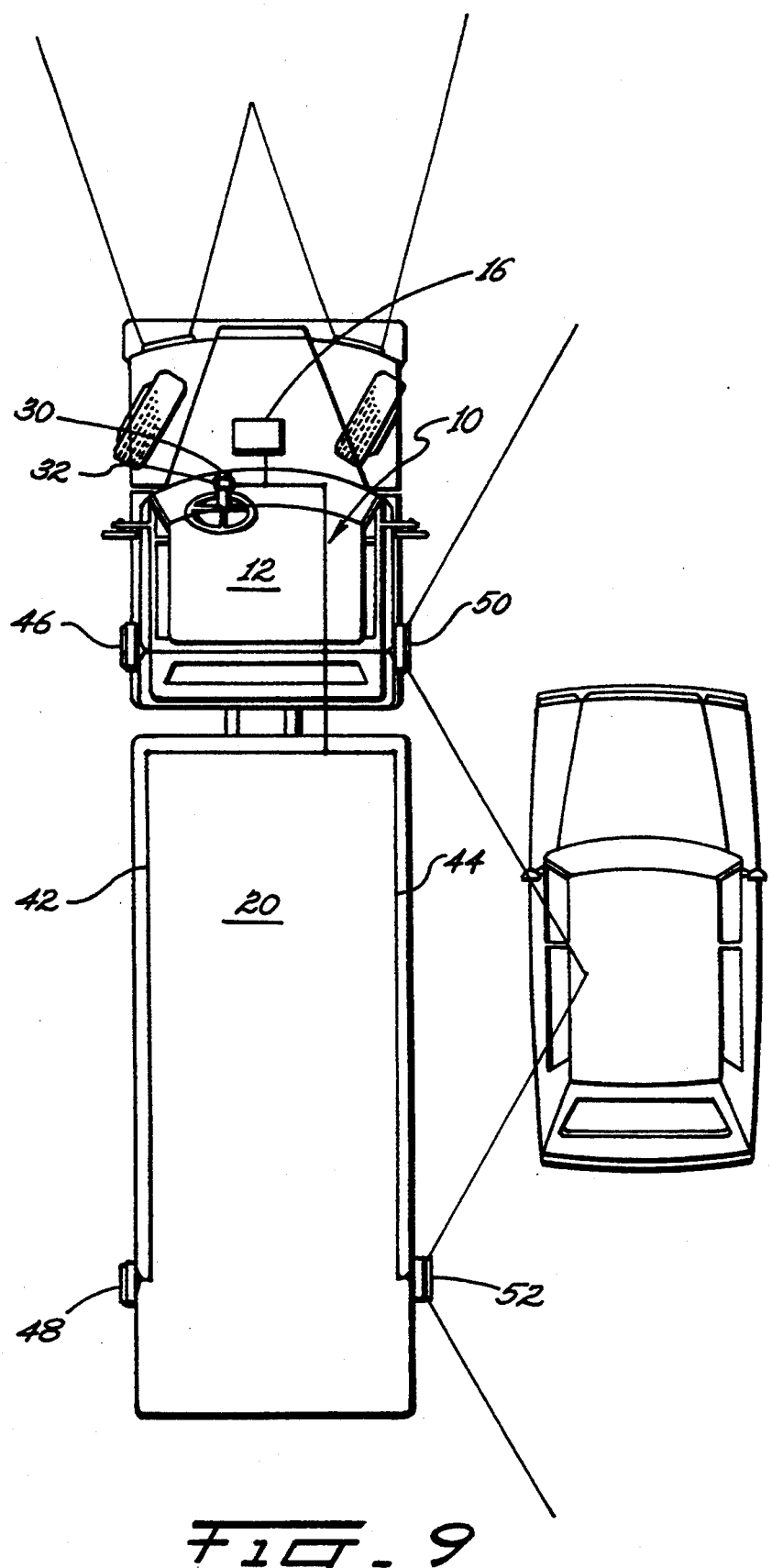
FIG. 9 is a top view of the invention shown in FIG. 1 showing the sectors of light emitted by the side lamps from the tractor-trailer vehicle.

In the preferred embodiment the side-lighting arrangement is adapted for controlling sectors of light on the side of a vehicle typically a tractor trailer vehicle having a cab portion and a tractor portion as shown in FIGS. 1 and 2. In alternate embodiments, the mounting devices may be configured for attachment to rear view mirrors as is shown in FIGS. 5A, 5B, or on a roof rack as is shown in FIGS. 6, 7 and 8.

Figure 3:
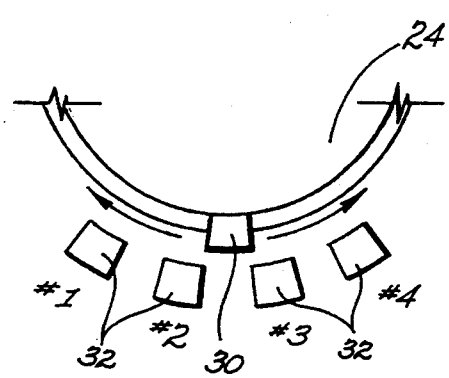
FIG. 3 is a block schematic diagram showing an architecture of hall sensors mounted on a steering wheel mechanism of the invention shown in FIG. 2.

In the preferred embodiment the wheel sensing apparatus is connected to the steering wheel 22 adapted to sense motion of said steering wheel during cornering, said steering wheel constructed of a steering shaft and a steering wheel. The steering wheel sensing apparatus typically comprises a "Hall Effect" sensor 14, as shown in FIG. 3, wherein a magnet is fastened on a steering column 24 adapted for rotational movement and four spaced apart hall effect sensors are radially positioned in a spaced apart relationship and the position No.1, No. 2, No. 3, and No. 4, and consists of a steering wheel angle sensor adapted to detect a change in angle of the steering wheel resulting from axial movement of the steering column. The steering wheel 22 also includes a conventional turn indicator typically actuated by a driver, indicating his intent to turn the steering wheel and front wheels of the vehicle for cornering and includes a turning indicator sensor for detecting actuation of the turn indicator. As is shown in FIG. 2, both of the steering wheel angle sensors and the turning indicating sensors are connected to the microprocessor 18 for outputting an electric signal corresponding to a) the angle of the steering wheel indicating that cornering is in progress, and b) the angle of the turn indicator on the basis of the steering wheel angle input from the steering wheel angle sensor and the input from the turn indicator sensor. The microprocessor also provides a control device for converting the control signal output from a electronic control means into a power output, there being a power source connected to the microprocessor and the microprocessor being connected in turn to a right hand set of sidelight illuminating devices and a left set of sidelight illuminating devices. The power control device is adapted for selectively indicating the appropriated set of lights to illuminate which matches the side of the vehicle toward which a turn is indicated.

Each of the side lamp lighting devices, typically a Hela FOGLITES ® automotive lighting fixture, includes a housing device for containing a lamp for providing a light source, the light source having a wide angle beam of light.

In the alternate manually operated embodiment, the housing of the Hela FOGLITES ® automotive lighting fixture typically includes a mounting means for selectively mounting one or more side lighting devices on selected side positions on a cab or a trailer location of the motor vehicle wherein a power control switch, typically a conventional turn signal device controls the illumination of the sidelights at the option of an operator of the motor vehicle responsive to actuation of a turn signal in combination with a time-delay feature.

The invention further comprises a method of automatically illuminating the area adjacent a selected side of a motor vehicle, during cornering and otherwise at the option of the driver, employing the sidelighting arrangement of the invention including two sets of sidelamps for selectively mounting on the side of a motor vehicle for laterally projecting a sector of light toward an area on the side toward which the vehicle is cornering. The operation for illuminating the side of a vehicle in the direction of turning will be described in detail in conjunction with FIGS. 2 & 3 and the operation of the side-light control unit as diagramed in FIGS. 2 and 3 will be described in detail in conjunction with the logic flow chart in FIG. 4.

Figure 4:
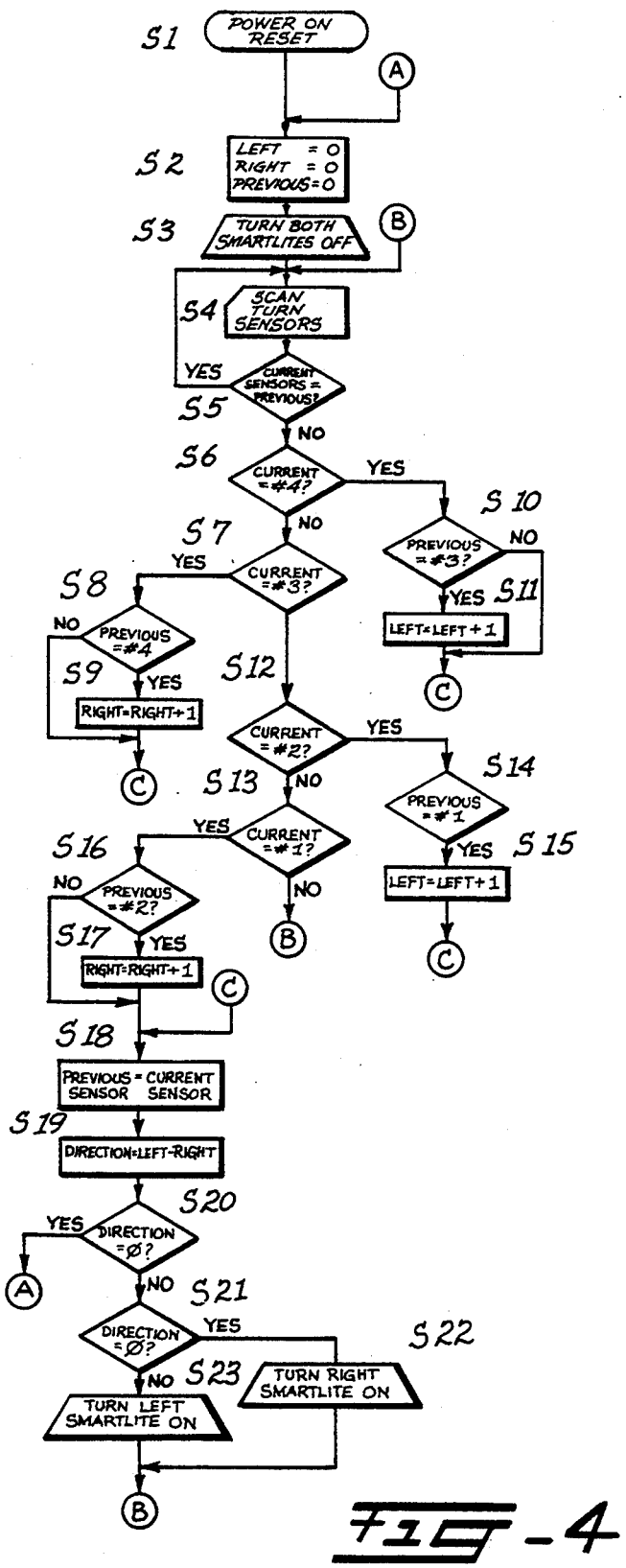
FIG. 4 is a flow chart illustrating the processing steps of the present invention of FIG. 2.

When the sidelight control device is first powered on, certain initial conditions for the control device are established as shown in FIG. 4 steps S1 and S2. Steering wheel rotation counters LEFT and RIGHT are set to 0 indicating 0 rotations of the wheel. The side-lamp driver circuits are both turned off as indicated in step S3.

After initialization, the side-light control device enters the scan sensor mode as indicated in step S4. The steering sensor arrangement is mounted on the steering column for the purpose of automatically sensing when a turn is being initiated. A typical sensor arrangement is shown in FIG. 3. A magnet is affixed on the moving portion of the steering column. Hall effect magnetic switches are mounted on the stationary portion of the steering column and electrically connected to the side-light control mechanism. when the steering wheel is in the neutral or "straight ahead" position, the magnet is positioned between switches 2 and 3. Other types of sensors, such as mechanical switches, micro switches, optical photo-switches can also be used to sense the position of the steering wheel.

To initiate a left turn, the driver rotates the steering wheel counter-clockwise causing the magnet to pass by sensors 3 then 4. As shown in steps S6, S10 and S11 on FIG. 4, when the control unit senses the magnet at switch 4 and the magnet was last detected by switch 3 the control device acknowledges the initiation of a left turn by incrementing the left turn counter. To accommodate multiple rotations of the steering wheel, the left turn counter is also incremented when the control unit senses the magnet at switch 2 with the last position detected being switch 1. This is shown in FIG. 3 and steps S12, S14 and S15 of FIG. 4. When the control unit recognizes a left hand turn by incrementing the left turn counter, it immediately resumes processing at step S18.

The operation of right hand turns is exactly opposite from that of left hand turns. As seen from FIGS. 3 and steps S7, S8, S9, S13, S16 and S17, the right turn counter is incremented when the magnet is detected at switches 3 or 1 with the previous detection switch being 4 or 1 respectively. When the control unit recognizes a right hand turn by incrementing the right turn counter, it immediately resumes processing at step S18.

When the magnet is not detected at all, the control device continues scanning the sensors until the magnet is detected. When the control device does not detect the magnet at any of the switch positions, the negative decision holds true in FIG. 4 steps S5, S6, S7, S12 and S13, so switch scanning resumes at step S4.

The decision as to whether to turn on one of the side-lights is diagramed in FIG. 4 steps S18 through S23. Since the control device arrives at FIG. 4 step S18 only when the magnet is detected, the current position of the magnet is updated as shown in FIG. 4 step S18. Steps 19 and 20 show how the process of deciding which light to turn on is carried out. The amount of left rotation is compared to the amount of right rotation and if they balance processing resumes back at step S2 whereby the counters are returned to zero and all lights are turned off. When the resulting difference is negative, then the wheel has been turned more clockwise than counter-clockwise and a right hand turn is in progress so the right hand light is turned on. This is shown in FIG. 4 steps S20, S21 and S22. If the difference is positive, indicating more counter-clockwise than clockwise turning of the steering wheel, then a left hand turn is in or still in progress so the right side lights are turned on. This process is shown in FIG. 10 steps S20, S21 and S23. After updating the lights, the control device resumes operation at step S4.

In alternate embodiment of the invention the sidelight arrangement is adapted to turn on only when the directional signals are used i.e. when the turn signal is activated and lights on the appropriate side corresponding to the directional lights used. In the alternate embodiment the microprocessor is connected to the power source typically a battery by a relay apparatus and the directional turn indicator. Alternatively the turn indicator illumination device connected by a splice or an adaptor.

In a further embodiment of the invention instead of being activated by the turning of the steering wheel, the side light apparatus is activated by the "on signal" taken from the actuation of the turn signal exclusively. Preferred embodiments, smart lights are initiated by both.

In an alternate embodiment of the sidelight arrangement, a feature is provided such that the first and second side light circuits are figured to turn off automatically within two seconds after the turn signal is turned off there being a relay apparatus provided in the circuit. The advantages to the alternate embodiment system are that as it relates to tractor trailer trucks wherein steering mechanisms typically have a large amount of free play. Where such free play is encountered in the steering mechanism it is more beneficial to connect the side light apparatus to the turn signal for improved performance. In yet a further embodiment of the invention an additional feature can be incorporated in the smart light circuit apparatus including a audio device which emits a loud audible signal, either a beep or a sound byte from a voice chip, when the directional signals are utilized, but only after the eleventh to fourteenth blink of the directional light. The purpose of this device is to remind drivers in a noisy vehicle i.e. either a mechanical noise associated with the operation of the truck or by loud radio music, chosen by the operator, or drivers with hearing deficiencies to indicate the directional lights are still on. It is further beneficial in the event that the interior turn indicator bulbs are defective and are not illuminating.

What is claimed is:

1. A sidelighting arrangement for selectively projecting illumination on a side of a motor vehicle, in combination with a turn indicator apparatus comprising:
   a) the turn indicator apparatus comprises a turn lever configured to move between a right turn angle position to a left turn angle connected to sensing means
   b) power control for energizing the sidelight arrangement means comprising an electrical power source
   c) the sensing means comprises a turn indicator sensor for detecting actuation and direction of the turn lever by an operator;
   d) sidelight means for laterally projecting a section of illumination toward a selected area adjacent the side of the body of the vehicle on the side corresponding to the direction in which the vehicle is turning comprising two sets of sidelights each, mounted on opposite sides of the motor vehicle and each set comprising;
      i) light emitting means for emitting rays of light in a wide arc in a direction orthogonal to the axis of the vehicle body comprising lamp elements contained in a housing including mounting means;
      ii) a first side-lamp driver circuit means for energizing one or more lamp elements mounted of a first side of the vehicle;
      iii) a second side-lamp driver circuit means for energizing one or more lamp elements mounted on a second side of the vehicle;
   e) vehicle mounting means for mounting the light emitting means in selected locations on a selected side of the body of the motor vehicle.
   f) a microprocessor means for activating the side light means connected to the turn indicator sensor and the electrical power source for receiving input as to the turn angle of the turn lever connected to the first side-lamp driver circuit means and to the second side-lamp driver circuit means for manually turning on the sidelight means on the side of the vehicle corresponding to the direction in which the steering wheel is turned and automatically turning them off when the turn lever is returned to a neutral position.

2. The apparatus of claim 1 wherein the sidelight means comprises a plurality of lamp devices with at least one lamp device comprising:
   i) a housing means for containing a lamp for providing a light source;
   ii) the light source contained in the housing seen having a wide angle beam of light;
   iii) lens means for controlling the beam of light emitted by the light source;
   iv) attachment means for selectively mounting the housing on a selected mounting device on a selected side position on a motor vehicle.

3. The apparatus of claim 1 wherein the first sidelamp driver circuit means is adapted for use on a tractor trailer and comprises at least one left trailer light and at least one left cab light.

4. The apparatus of claim 1 wherein the second sidelight means is adapted for use on a tractor trailer and comprises at least one right trailer light and at least one right corner cab light.

5. The apparatus of claim 1 wherein the sensing means comprises a fixed sensing device mounted on the a fixed steering column and movable sensing means mounted on the turn lever.

6. The apparatus of claim 1 wherein the micro processor means is connected to a power source and connected to the sensing means for receiving input from the sensing means.

7. The apparatus of claim 1 wherein the turn lever is mounted on a steering mechanism for directing the motor vehicle and for turning comprising a steering wheel.

8. The apparatus of claim 1 wherein the electronic control device includes electronic control means for outputting an electrical signal corresponding to the:
   i) angle of the turn lever and;
   ii) angle of the turn indicator on the basis of the turn lever angle input from said turn indicator; and
   iii) power control means for converting the control signal output from said electronic control means into a power output wherein the power control means comprises means for controlling the illumination of the side lights during cornering of the motor vehicle responsive to the actuation of the turn signal.

9. A sidelighting arrangement for controlling illumination projecting laterally from sidelights mounted on the side of a vehicle in the direction in which the steering wheel of the vehicle is turned and automatically turning them off when the wheel returns to a neutral position comprising:
   a) sidelight means for laterally projecting a section of illumination toward a selected area adjacent the side of the body of the vehicle on the side corresponding to the direction in which the vehicle is turning comprising two sets of sidelights each, mounted on opposite sides of the motor vehicle and each set comprising;
      i) light emitting means for emitting rays of light in a wide arc in a direction orthogonal to the axis of the vehicle body comprising lamp elements contained in a housing including mounting means;
      ii) a first side-lamp driver circuit means for energizing one or more lamp elements mounted on a first side of the vehicle;

iii) a second side-lamp driver circuit means for energizing one or more lamp elements mounted on a second side of the vehicle and;
b) a first sidelighting circuit for lighting the first side of a vehicle and a second sidelighting circuit for lighting the second side of the vehicle;
c) sensing means for sensing the amount and direction in which a steering wheel is turned;
d) steering wheel means comprising a fixed steering wheel column and a movable steering wheel mounted on an annular hub;
e) sensing means comprising a fixed sensing device mounted on the fixed steering column and movable sensing means mounted on the movable annular hub of the steering wheel comprising a plurality of "Hall Effect" sensors;
f) a microprocessor means connected to a power source comprising a sidelight control device connected to the sensing means for receiving input as to the direction and amount the steering wheel is directedly connected to a power source and connected to the first sidelight apparatus and connected to the second sidelight apparatus for automatically turning on the set of side lights apparatus corresponding to the direction in which the steering wheel is turned and automatically turning them off when the steering wheel returns to neutral.

10. The arrangement of claim 9 wherein the sensing means comprises a fixed sensing device mounted on the a fixed steering column and movable sensing means mounted on the movable annular hub of the steering wheel comprising of a plurality of "Hall Effect" sensors.

11. The arrangement of claim 9 wherein the steering means comprises a fixed steering wheel column and a movable steering wheel rotatable about the axis of the steering wheel column mounted on an annular hub.

12. The arrangement of claim 9 wherein the steering wheel means comprises a turning indicating sensor for detecting the actuation of the turn indicator mounted on the steering wheel.

13. The arrangement of claim 9 wherein the sidelight control device provides electronic control for outputting an electrical signal corresponding to the:
i) angle of the steering wheel and;
ii) angle of the turn indicator on the basis of the steering wheel angle input from said steering wheel angle sensor and the input from the turn indicator sensor, and;
iii) power control means for converting the control signal output from said electronic control means into a power output wherein the power control means comprises means for controlling the illumination of the side lights during cornering of the motor vehicle responsive to the steering wheel in actuation of the turn signal.

14. The arrangement of claim 9 wherein the power control means comprises means for controlling the illumination of the side lights during cornering of the motor vehicle responsive to the combination of steering wheel and actuation of the turn signal.

15. A method of laterally projecting illumination from the side of a vehicle and automatically turning on sidelights of the vehicle on the side corresponding to the direction in which the steering wheel of the vehicle is being turned and a neutral position comprising the steps of:
a) providing a sidelighting arrangement for laterally projecting a section of illumination toward a selected area adjacent the side of the body of the vehicle on the side corresponding to the direction in which the vehicle is turning comprising two sets of sidelights each, mounted on opposite sides of the motor vehicle and each set comprising;
i) light emitting means for emitting rays of light in a wide arc in a direction orthogonal to the axis of the vehicle body comprising lamp elements contained in a housing including mounting means;
ii) a first side-lamp driver circuit means for energizing one or more lamp elements mounted on a first side of the vehicle;
iii) a second side-lamp driver circuit means for energizing one or more lamp elements mounted on a second side of the vehicle;
b) powering on the sidelight control device;
c) establishing initial conditions for the control device;
d) setting steering wheel rotation counters LEFT and RIGHT;
e) providing that the sidelight control device enters the scan sensor mode;
f) positioning the steering wheel in the neutral or "straight ahead" position; and
g) initiating a turn, in particular a left turn, rotating the steering wheel counter-clockwise causing the magnet to pass by sensors #3 then #4, when the control unit senses the magnet at switch #4, having been last detected by switch #3, the control device acknowledges the initiation of a left turn by incrementing the left turn counter and when the control unit recognizes a left hand turn by incrementing the left turn counter, it immediately resumes processing;
h) the operation of right hand turns is exactly opposite from that of left hand turns; the right turn counter is incremented when the magnet is detected at switches #3 or #1 with the previous detection switch being #4 or #1 respectively; and when the control unit recognizes a right hand turn by incrementing the right turn counter, it immediately resumes processing;
i) when the magnet is not detected at all, the control device continues scanning the sensors until the magnet is detected; and when the control device does not detect the magnet at any of the switch positions, the negative decision holds true, so switch scanning resumes;
j) implementing the decision as to turn on one of the side-lights; the amount of left rotation by comparing to the amount of right rotation and if they balance processing resumes back whereby the counters are returned in zero and all lights are turned off; when the resulting difference is negative, then the wheel has been turned more clockwise than counter-clockwise and a right hand turn is in progress so the right hand light is turned on; however, if the difference is positive, indicating more counter-clockwise than clockwise turning of the steering wheel, then a lift hand turn is in or still in progress so the right side lights are turned on; wherein after updating the lights, the control device resumes operation.

* * * * *